United States Patent
Qian

(10) Patent No.: US 11,520,978 B2
(45) Date of Patent: Dec. 6, 2022

(54) FORM CUSTOMIZATION METHOD AND DEVICE

(71) Applicant: HEFEI HANTENG INFORMATION TECHNOLOGY CO., LTD., Anhui (CN)

(72) Inventor: Yegan Qian, Anhui (CN)

(73) Assignee: Hefei Hanteng Information Technology Co., Ltd

( * ) Notice: Subject to any disclaimer, the term of this patent is extended or adjusted under 35 U.S.C. 154(b) by 263 days.

(21) Appl. No.: 16/677,829

(22) Filed: Nov. 8, 2019

(65) Prior Publication Data

US 2020/0073926 A1     Mar. 5, 2020

Related U.S. Application Data

(63) Continuation of application No. PCT/CN2018/085243, filed on May 1, 2018.

(30) Foreign Application Priority Data

May 9, 2017 (CN) .......................... 201710319141.3

(51) Int. Cl.
   *G06F 40/186*        (2020.01)
   *G06F 40/174*        (2020.01)

(52) U.S. Cl.
   CPC .......... *G06F 40/186* (2020.01); *G06F 40/174* (2020.01)

(58) Field of Classification Search
   CPC ............................ G06F 40/186; G06F 40/174
   See application file for complete search history.

(56) References Cited

U.S. PATENT DOCUMENTS

| | | | | |
|---|---|---|---|---|
| 7,000,182 B1 * | 2/2006 | Iremonger | ............. | G06Q 10/10 |
| | | | | 707/999.102 |
| 7,062,502 B1 * | 6/2006 | Kesler | .................. | G06F 16/252 |
| 7,379,945 B1 * | 5/2008 | Hirsch | .................. | G06F 40/143 |
| 7,475,333 B2 * | 1/2009 | Otter | ..................... | G06Q 10/10 |
| | | | | 715/253 |

(Continued)

FOREIGN PATENT DOCUMENTS

| | | | |
|---|---|---|---|
| CN | 101460950 A | | 6/2009 |
| CN | 102779040 A | | 11/2012 |

(Continued)

OTHER PUBLICATIONS

Chen et al., "Method and device for generating user-define form", pulication date Nov. 14, 2012, Machine translation of publication No. CN02779040, pp. 1-21.*

*Primary Examiner* — Thu V Huynh

(57) ABSTRACT

A form customization method and device, through establishment of a form information table, a form field information table and a form field option information table, the form information table and form field information table are associated by primary key and foreign key, the form field information table and form field option information table are associated by "foreign key-primary key", so as to define the form template and complete the form design quickly and conveniently. The form is then rendered by the form template data and the corresponding CSS style. The form customization device mainly includes a form template creation unit, a form template generation and presentation unit and a form template modification unit.

4 Claims, 3 Drawing Sheets

(56) References Cited

U.S. PATENT DOCUMENTS

| | | | |
|---|---|---|---|
| 2008/0114733 A1 | 5/2008 | Friesenhahn et al. | |
| 2011/0191303 A1* | 8/2011 | Kaufman | G06F 16/20 |
| | | | 707/684 |
| 2011/0296298 A1* | 12/2011 | Ahuja | G06F 16/972 |
| | | | 715/248 |
| 2012/0254714 A1* | 10/2012 | Peters | G06F 16/958 |
| | | | 715/209 |
| 2014/0280026 A1* | 9/2014 | Anderson | G06F 16/288 |
| | | | 707/714 |
| 2016/0253350 A1* | 9/2016 | Moulik | G06F 16/22 |
| | | | 707/694 |
| 2016/0292143 A1* | 10/2016 | Rametta | G06F 9/45529 |

FOREIGN PATENT DOCUMENTS

| | | |
|---|---|---|
| CN | 105912517 A | 8/2016 |
| CN | 107153544 A | 9/2017 |

\* cited by examiner

FORM CUSTOMIZATION METHOD AND DEVICE

CROSS-REFERENCE TO RELATED APPLICATIONS

This application is a continuation of International Patent Application PCT/CN2018/085243, filed on May 1, 2018, which claims the benefit of priority from Chinese Patent Application NO. 201710319141.3, filed on May 9, 2017. The content of the aforementioned application, including any intervening amendments thereto, is incorporated herein by reference.

TECHNICAL FIELD

The invention relates to a form customization method, in particular to a form customization method by users without coding.

BACKGROUND OF THE INVENTION

With the development and needs of information system business, users usually need personalized electronic forms, and with the continuous development of the user's business, the previously used electronic forms sometimes need to be changed to suit the development of the business. The implementation and changes of these e-forms require coding and rewriting from a software development perspective. Each different e-form needs different coding implementations, which not only increases the workload of developers, but also makes the user bear more research and development costs and longer form implementation time. Therefore, flexible and efficient methods and devices for e-form customization have become the common requirement of both developers and business people.

Chinese Patent No. 201210209275.7 discloses a method and device for generating a customization form. The method comprises the following steps: creating a new form information template which includes a form information table, a field information table, a form field relation table, a field type information table, and a field type subitem information table; setting a form information table according to users' definition; and creating the field information table containing fields to obtain the form template information; and generating and presenting the custom form according to the form template information. The above-mentioned method can only draw and present a customization form that is relatively simple and regular, and complex and irregular forms cannot be presented, so there is still a distance from the actual application.

SUMMARY OF THE INVENTION

In order to solve the above practical problems, the present invention provides a form customization method and device, which realizes that users can customize various complex and diverse electronic forms conveniently and efficiently without any programming knowledge.

The present invention discloses a form customized method, including:

1) creating form information template wherein the form template information includes a form information table, a field information table and a field option information table, which are established in the database;

the form information table comprises a form number ID, a form name and related information, and is associated with the field information table by "foreign key-primary key"; the field information table comprises a field number ID, a field name, a field type, the number of rows and columns where the field name is located, a field title width, a field content width and other field information. The options information table is used to store option information of special field, including a special field primary key, an option name, an option value and other related information. In the present invention, the field name and the field content may be referred to as a field title and a title content, respectively;

the form number ID in the form information table is unique in the form information table and serves as the primary key of the form. The field number ID in the field information table is unique and used as the primary key. The field information table also contains a foreign key, that is, the form number ID; the option information table comprises the unique number ID as the primary key and the field number ID as a foreign key;

a special field type means that the value of the corresponding field content may be one or more of multiple option values, that is, the value of the title content corresponding to the title of the field needs to be selected from two or more setting option values, and one or more option value values are selected;

2) according to the field type of the field in the field information table, storing the field information in the field information table according to the field type in the field information table; storing the field number ID, respective option names, the option value of the field to the option information table for a special field type;

acquiring a form template data wherein based on the "foreign key-primary key" association of form information table, field information table and option information table, all form template data of the form can be obtained from each table according to the form number ID.

In the field information table, row number, column number, field title column width and title content column width, these four table fields are necessary. During the generation and drawing of the form, not only the CSS style is indispensable. Moreover, if the field type control is not configured by drag and drop visual positioning, the position and width of each field including field title and title content in the form are unable to be calculated. It is impossible to draw header cells and table cells accurately, and it is also difficult to implement complex and diverse custom forms.

The column width is calculated by percentage, that is, the column width of the field title or the content of the title refers to the percentage of the whole form row width. According to these four table fields, each header cell and table cell can be accurately drawn in the form. According to the form template data, in the process of drawing and rendering the form, the value of the form field type will determine the control type generated by the corresponding table cell. If it is a special field type, it is necessary to load the option values of the corresponding control, draw and present a complex and diverse custom form through CSS style.

Modification or deletion is performed in the form template information, including the modification or deletion of form information table, field information table and option information table.

The invention further provides a form customization device, comprising:

a form template creation unit, where users input form information such as form name according to business requirements, and the database will automatically generate unique form number ID for the form information; and then input various fields of the form, including the field name and the location Information such as row and column, field title, and column width of the column content, and saved to the field information table together with the form number ID (the form information table primary key), and the database automatically generates a unique field number ID for the field information; if the created field is a special field, an option name and an option value for the field are created and inserted into the option information table along with the field number ID (the field information table primary key). Tables are persisted to a database server;

a form template generation and presentation unit, which is configured to performing the following steps: querying form information table, field information table and option information table according to the form number and "foreign key-primary key" association to obtain form template information, and generating corresponding HTML control according to the field type, based on the row and column position of a field in the form and the column width of field title and title content, as well as the loaded CSS style, drawing and presenting a form instance in the interface;

a form template modification unit, which is configured to performing the following steps: entering the form template editing interface according to the form number. Each form field and field option has corresponding edit and delete buttons. Users can modify and delete template information by the buttons.

The invention has the following beneficial effects. The design of the invention aims at business personnel rather than developers. Users without any programming skills such as HTML or CSS or any other programming languages can design any required forms according to the business requirements. By inputting the field name, the number of rows and columns of the field, the type of the selected field, the title of the field, and the column width of the title content, users can create new business forms as required or edit business form to fit new business changes. The present invention is simple for maintaining, and can save time for development and human resources, and meet the user's more electronic form application needs at a lower cost.

BRIEF DESCRIPTION OF THE DRAWINGS

For better explanation of the technical solutions of the embodiments of the invention, the following is a brief description of the drawings needed to describe the embodiments. It is obvious that the drawings described below are only embodiments of the invention, and for ordinary skilled in person in the art, without creative effort, further drawings may also be obtained on the basis of these drawings.

DETAILED DESCRIPTION OF EMBODIMENTS

Figure 1:
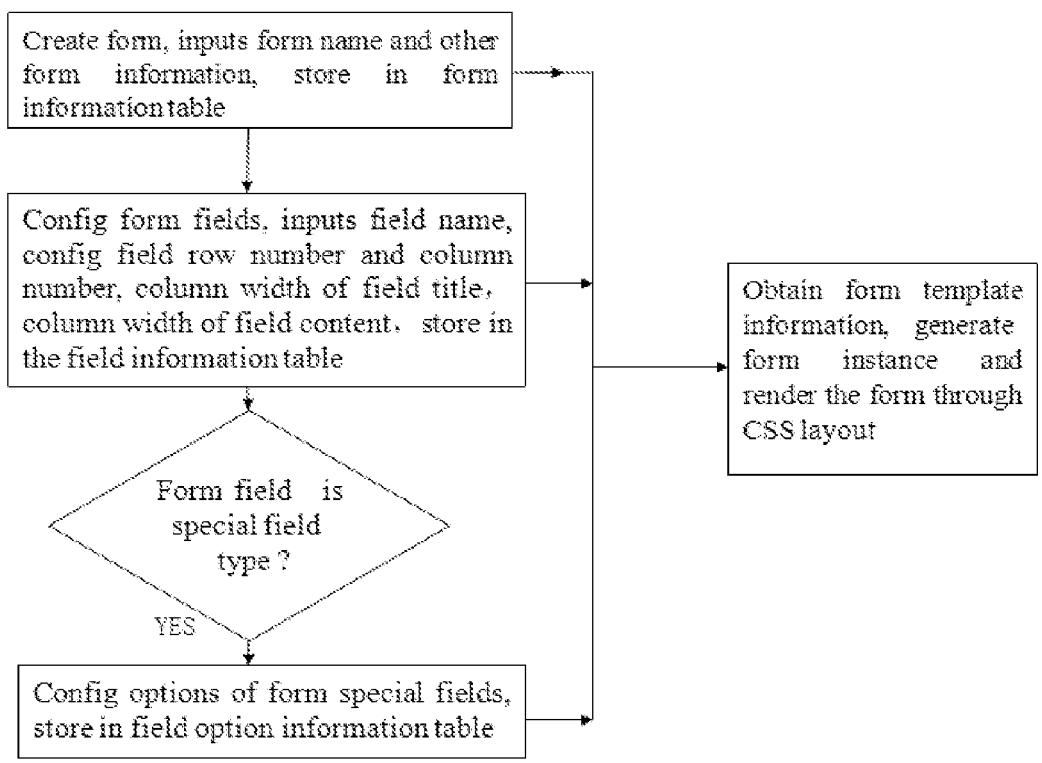
FIG. 1 is a flowchart of a form customization method according to an embodiment of the present invention.

The embodiments of the invention are described in detail below in combination with the attached drawings. FIG. 1 is a flow chart of the form customization method of the embodiments of the invention. As shown in FIG. 1, the method comprises the following steps.

Figure 2:
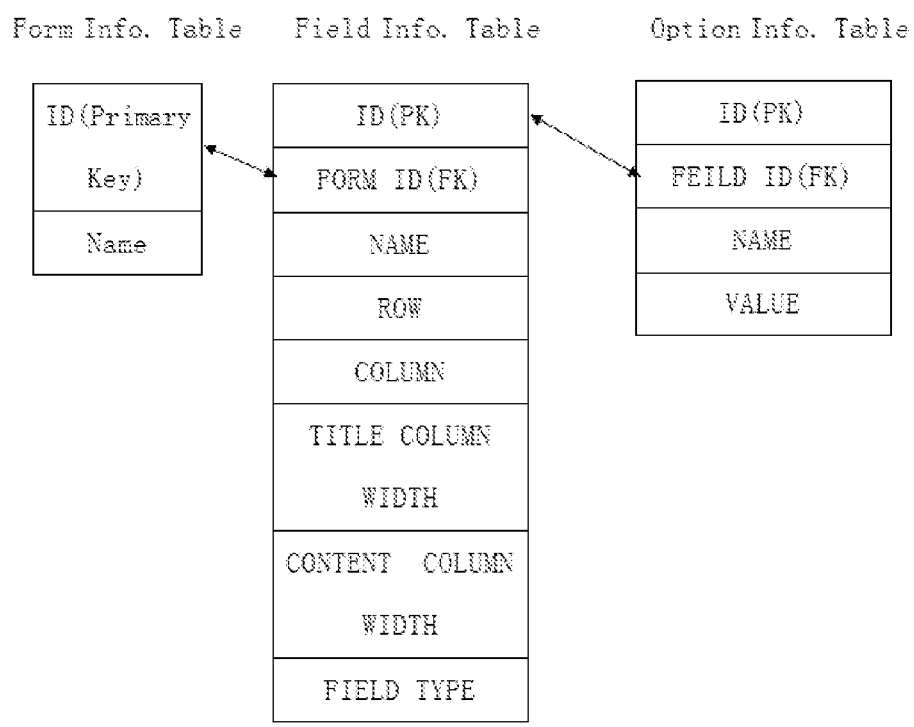
FIG. 2 is a a diagram of a database table according to an embodiment of the present invention.

Establishing the form information table, the form field information table (referred to as the field information table) and the form field option information table (referred to as the option information table), and persisting the three tables in the database, as shown in FIG. 2, thus forming the form template information.

The form information table includes the form number ID and the form name. The form number ID, as the primary key, is automatically generated by the database when the form information is inserted, and is associated with the field information table through the foreign key primary key. The field information table includes the field number ID, field name, field type, number of rows, number of columns, field Title width, field content width and other field information, the field number ID as the primary key is automatically generated by the database when inserting the field information table. The field information table is associated with the option information table through "foreign key-primary key"; the option information table contains the number ID, special field number ID (foreign key), option name, option value and other related information automatically generated by the database.

According to the field type of the field in the field information table, if it is a special field type, you need to save the information of the field in the field information table, and then save the field number ID, each option name, option value of the field to the option information table.

Figure 3:
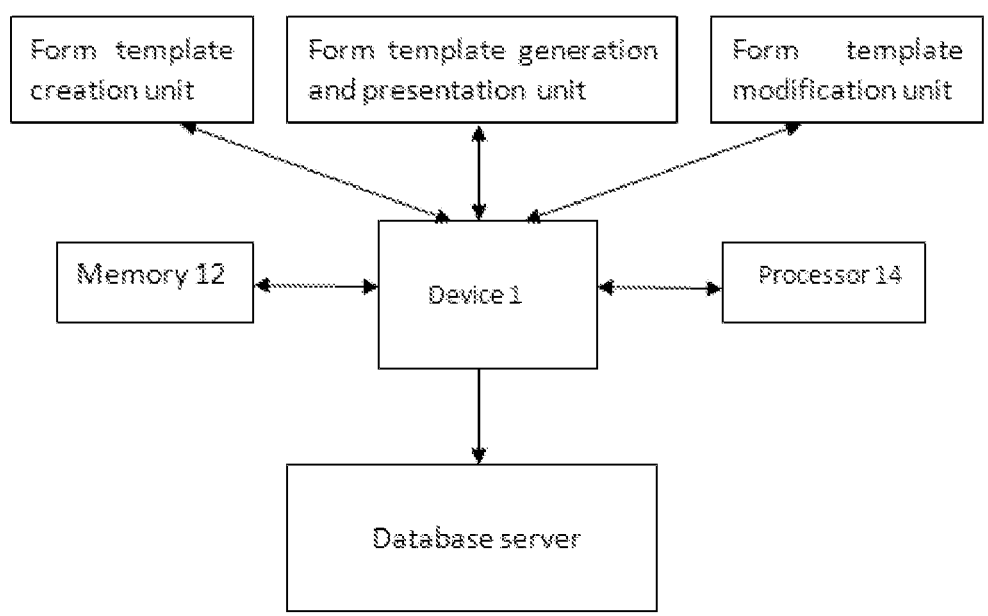
FIG. 3 is a schematic diagram of a form customization device according to an embodiment of the invention.

Form template data acquisition, modification and form rendering, as shown in FIG. 3, based on the "foreign key primary key" association of form information table, field information and option information table, all form template data of the form can be obtained from each table according to the form number ID. The position space of each form field in the form instance is calculated according to the number of rows, column number, field title column width, and title content column width in the field information table. The value of the form field type also determines the control type generated by the corresponding table cell. If it is a special field type, the value of each option of the corresponding control is loaded, then renders an instance of the custom form by loading the CSS style to the form layout.

The above is only a preferred embodiment of the invention, and is not used to limit the protection scope of the invention. Based on the embodiments in the invention, all other embodiments obtained by those skilled in the art without creative labor belong to the scope of protection of the invention.

I claim:

1. A method for customizing electronic forms by users without coding, said method comprising designing electronic forms and presenting electronic forms;

said designing electronic forms comprising:

establishing form template information in a database;

wherein said template information comprises a form information table, a field information table and an option information table;

said form information table comprises a form name, a form number ID and related form information, and is associated with said field information table through "foreign key-primary key"; said field information table comprises a field number ID, a field name, a field type, number of rows and columns where said field name is located, a field title width, a field content width and other field information, and said field information table is associated with said option information table through "foreign key-primary key"; said option information table comprises option information of special field, said option information comprises a primary key value of said special field, an option name, an option value and other relevant information; said field name and a field content are also referred to as a field title and a title content respectively;

said form number ID in said form information table is unique in said form information table and serves as a primary key; said field number ID in said field information table is unique in said field information table and serves as a primary key, and said field information table further comprises said form number ID as a foreign key; said option information table comprises a unique number ID as a primary key of the option information table, and the option information table further comprises the field number ID as a foreign key; wherein each table number ID generally refers to a unique field in respective tables;

a special field type comprising a value of corresponding field content is at least one option value, that is, a value of the title content corresponding to the field title needs to be selected from at least two option values, and at least one option value is selected;

inputting a form name and other form information;

storing said form name and said other form information in said form information table;

inputting various fields of the form, including field name, field row number and field column number, column width of said field name, column width of said field content;

inputting options on condition that said field type of said field is a special field type;

storing field information in said field information table; and storing said field number ID, respective option names, option values of a field in said option information table for a special field type; and further said presenting electronic forms further comprising:

obtaining all form template data of a form from each table according to said form number ID and said "foreign key—primary key" association of the form information table, the field information table and the option information table; and drawing and presenting complex and diverse custom forms based on four table fields and a CSS style, wherein four table fields, necessary in the field information table, which are field row number and field column number, column width of said field name, column width of said field content, position the field title and the title content in a form layout, a table head cell and a table cell are drawn accurately in the form according to the four table fields; a CSS style is a cascading style sheets for HTML form layout, HTML represents HyperText Markup Language.

2. The method of claim 1, further comprising: calculating the width of the column by percentage:

wherein the width of the column is calculated by percentage, that is, the column width of the field title or title content refers to a percentage that occupies the width of the form row.

3. The method of claim 1, further comprising:

during the drawing process of the form, generating corresponding controls according to the values of the form field types; and rendering the controls in corresponding table cells.

4. The method of claim 1, further comprising:

modifying form template information including modification of the form information table, the field information table, and the option information table, deleting form template information including deletion of the form information table, the field information table and the option information table.

* * * * *